HIGH-FREQUENCY TRAFFIC SYSTEM OVER POWER SUPPLY LINES

Filed Aug. 27, 1947

Inventor
FRANCOIS C. M. BERGER

By Robert Harding Jr.

Attorney

Patented Dec. 11, 1951 2,577,731

UNITED STATES PATENT OFFICE 2,577,731

HIGH-FREQUENCY TRAFFIC SYSTEM OVER POWER SUPPLY LINES

François Charles Maurice Berger, Paris, France, assignor to International Standard Electric Corporation, New York, N. Y., a corporation of Delaware Application August 27, 1947, Serial No. 770,913
In France February 20, 1942

Section 1, Public Law 690, August 8, 1946
Patent expires February 20, 1962

7 Claims. (Cl. 179—2.5)

Figures 1, 2:
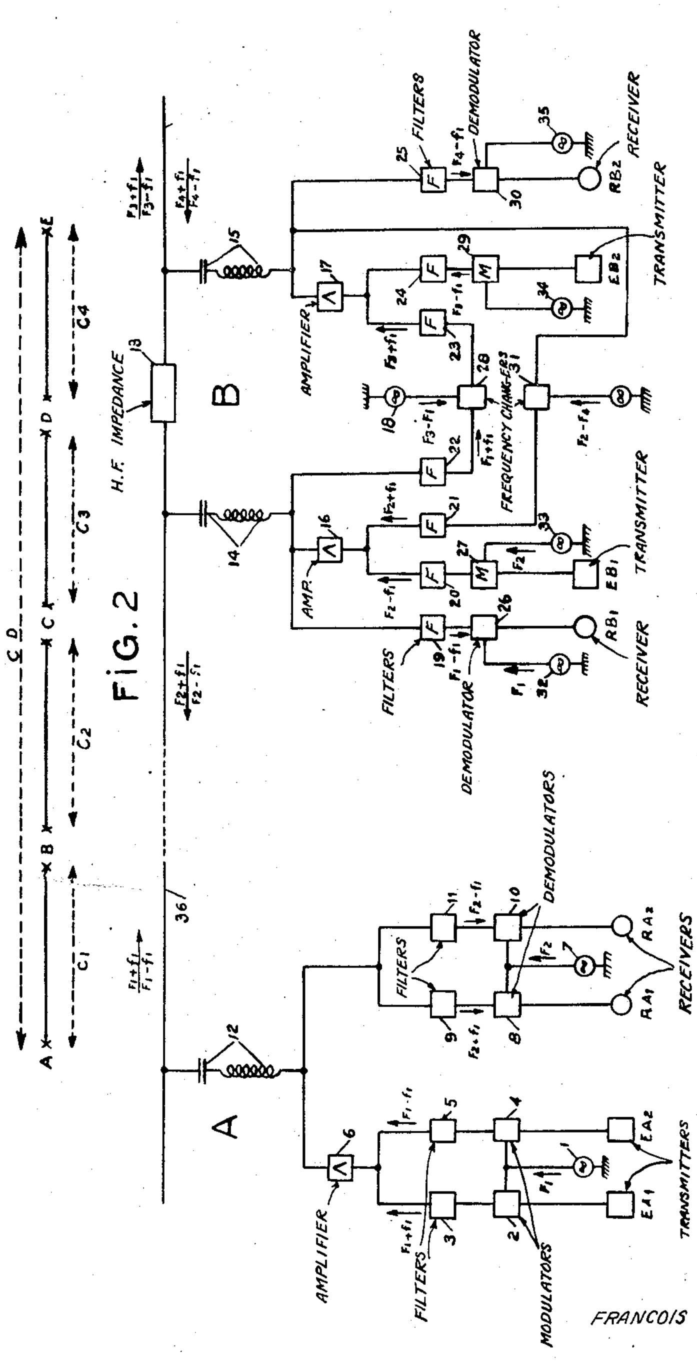

The number of frequencies that can be used for transmissions over power lines is limited by the extent of the frequency bands assigned to these transmissions. However, owing to the requirements for the service and supervision of the networks, the number of transmissions to be effected is continuously increasing. It is therefore necessary to provide arrangements that will permit better utilization of the various frequencies.

Furthermore, the connections between regulation or dispatching and productions centers, or between regulation centers, require long distance transmissions of very good quality that may be rapidly effected notwithstanding the transmissions already under way over the line sections employed for the said long distance transmissions.

The devices at present in use only permit the establishment of these long distance transmissions under conditions that are lacking in speed and certainty, and that require the use of two different frequencies for each line section.

The object of the present invention is a high frequency traffic system that makes it possible, without any increase in the number of carrier frequencies, to effect long distance transmissions over line sections already in use for nearby transmissions.

For this purpose, use is made of twin transmission channels with single side bands obtained by separately modulating the same carrier frequency by two audio frequencies, each of which corresponds to a transmission, and by only sending over the line, after modulation, the top band for one of the transmissions and the bottom band for the other transmission. One of the transmissions is employed for a direct long distance connection, and the other for a connection between nearby centers.

It is assumed (Fig. 1) that it is desired to obtain a direct transmission channel between the end stations A and E over a line comprising the high frequency sections AB, BC, CD and DE, over which nearby transmissions can be effected. The high frequency sections are separated from each other by isolating switches of the power line, or else by stopper circuits or any other suitable devices.

For the transmission between A and E, use is made of the bottom or top band of a carrier frequency modulated by the frequency of the said transmission, the other band being employed for a transmission between the stations A and B. At the station B, for the transmission AE, it is possible to merely amplify and retransmit over the section BC, or else to make a change of frequency over a new carrier wave and to amplify and retransmit one of the side bands over the section BC, the other band being employed for a transmission between the stations B and C.

Referring to Fig. 2, an explanation will now be given as an example without limitation of how equipment can be provided at the end stations and the intermediate stations for obtaining a transmission system according to the invention concept.

It is assumed that station A is an end station where transmissions originate and are received and where, furthermore, transmissions in transit are subjected to a change of frequency and amplified. The drawing shows only the circuits necessary for obtaining a distant communication and a nearby communication in each direction, the said circuits being sufficient to make the invention understandable. It is evident that there may be any number of transmissions of either kind and that these are only limited by the number of available carrier frequencies.

At the station A there are provided two transmitting sets $EA_1$ and $EA_2$ which may be phone transmitters, for example. It is assumed that the set $EA_1$ is assigned to the distant transmission and the set $EA_2$ to the nearby transmission. When the said transmitters are set into operation, the speaking currents produced thereby modulate a common carrier frequency $F_1$ produced by the generator 1. This modulation is effected in modulator 2 for the speaking currents of $EA_1$, and in modulator 4 for the speaking currents of $EA_2$.

At first the long distance transmission from A to E will be examined.

The modulated currents, upon leaving modulator 2, pass through a high selectivity filter 3 which permits passage of only one of the modulation side bands, e. g. the band $F_1$ to $F_1+f_1$ or $F_1S$. Upon leaving filter 3, the currents of the band $F_1S$ are amplified in a common amplifier 6 and are sent over the line conductors 36 across the coupling circuit 12.

At the intermediate station B there is disposed, in series with the conductor 36, a device 13 which has a high impedance for the high frequency currents of the transmissions that are made over the said conductor. Owing to the presence of this device, the modulated currents that proceed from station A are branched in to the tuning circuit 14. To the end of the tuning circuit which is not connected to the line conductor 36 there are connected various circuits that terminate in the devices 19, 16 and 22. Each of these devices is designed so as to permit passage of one definite side band only. The band $F_1S$ can pass only through filter 22. After passage through the said filter, the currents of the band $F_1S$ reach a frequency changing device 28 in which they are subjected to the action of a current of a given frequency which is produced by the generator 18 and is assumed to have a frequency $F_3-F_1$. From the frequency changer there are obtained two modulated bands $F_3$ to $F_3+f_1$ or $F_3S$ and $F_3-f_1$ to $F_3$ or $F_31$ which are sent into the high selectivity filter 23 which permits passage of the currents of the band $F_3S$ only. These currents are amplified in the common amplifier 17 and are sent across the coupling device 15 over the high frequency section of the line 36′ connecting stations B and C.

At station C, by a procedure similar to that just described, the transmission band $F_3S$ is changed in frequency (e. g. transformed into a band $F_5$ to $F_5+f_1$), amplified and retransmitted to a station D where the same operations are repeated in order to obtain the side band $F_7$ to $F_7+f_1$, for example. Upon arrival at the end station E, the currents are demodulated and are transformed into audio frequency currents.

It can be seen that direct transmission between A and E is effected by employing in each high frequency line section only the top side band obtained by modulating a carrier frequency. The bottom side band accordingly remains available and can be employed, as explained hereunder, for communications between nearby stations.

An explanation will now be given of how a long distance transmission from E to A passes in transit through station B and is received at station A.

It is assumed that this communication is retransmitted from station C to station B in the form of the top band of a carrier frequency $F_4$ modulated with the frequency $f_1$. The current of band $F_4$ to $F_4+f_1$ which arrives over the conductor 36′ is branched to the tuning circuit 15. It is received in the frequency changer 31 where it is subjected to a change of frequency by the action of a current having the frequency $F_2-F_4$. From the frequency changer 31, there are obtained the two modulated bands $F_2$ to $F_2+f_1$ or $F_2S$, and $F_2-f_1$ to $F_2$ or $F_21$. Filter 21 permits passage of the top band $F_2S$ only which is amplified in the common amplifier 16 and is sent over the line conductor 36 across the tuning circuit 14.

Upon arrival at station A, the said band $F_2S$ cannot pass through filter 11, but passes through filter 9 and is then demodulated in the device 8 under the action of a current of frequency $F_2$ produced by the generator 7.

There are obtained audio frequency currents which are received in the receiver RA1. Communication between stations A and E is thus directly established.

As has been explained, only the top band of the modulation of the carrier frequency $F_1$ has been employed for the transmission between A and E. The bottom band of the same modulation accordingly remains available for another transmission.

In the illustrated example, it is assumed that this band is employed for a transmission between stations A and B. For this purpose, the currents emitted by the transmitter $EA_2$ modulate the carrier frequency $F_1$ in the modulator 4. Of the thus modulated current, only the bottom band $F_1$ to $F_1-f_1$ can pass through filter 5. This band is then amplified in the common amplifier 6 and is transmitted over the line conductor 36 across the tuned circuit 12. It is received at station B where it alone can pass through filter 19. After passage through this filter, it is demodulated in the device 26 under the action of the current of frequency $F_1$ produced by the generator 32.

The current demodulated in this way is received in the receiver $RA_1$.

By the same procedure, a transmission may be effected between the transmitter $EB_1$ of station B and the receiver $RA_2$ of station A over the bottom side band $F_2-f_1$ to $F_2$. Similarly, a first transmission could be effected over the band $F_3-f_1$ to $F_3$ between the transmitting set $EB_2$ of station B and a set in station C, and a second one between the receiving set RA of station B and a set in station C by employing the band $F_4-f_1$ to $F_4$.

It can be seen that it is possible, according to the invention to employ the same carrier wave for obtaining two simultaneous transmissions over the same line.

It is of course evident that the various combinations of frequencies mentioned above, and also the assignment of the side bands have only been given as examples and that, without departing from the scope of the invention, it is possible to employ any frequency or combination of frequencies for obtaining the said bands and to assign them for direct transmissions through one or more stations or transmission routings at the junction points of different networks.

Furthermore, the transit in the intermediate stations may comprise a simple amplification without change of frequency in cases where the reaction of the high frequency sections of the power line is negligible.

I claim:

1. A high frequency communication system comprising a carrier circuit having two ends, a first station comprising means for generating a carrier and two intelligence signal bearing side bands of said carrier and means for coupling said station to one end of said circuit, a second station comprising means for receiving both said side bands, means coupled to said receiving means for selecting and retransmitting one of said side bands, means coupled to said receiving means for selecting and demodulating the other of said side bands and means for coupling said receiving means and said retransmitting means to a point intermediate the ends of said circuit, and a third station comprising means for receiving and demodulating said retransmitted side band and means for coupling said third station to the other end of said circuit.

2. A high frequency communication system comprising a carrier circuit having two portions, means for isolating one of said portions from the other of said portions at the frequency of said carrier, a first station comprising means for generating a carrier and two intelligence signal bearing side bands of said carrier and means for coupling said station to one end of one of said portions, a second station comprising means for receiving both said side bands, means for coupling said receiving means to the other end of said one portion, means coupled to said receiving means for selecting and retransmitting one of said side bands, means for coupling said retransmitting means to one end of the other of said portions, means coupled to said receiving means for selecting and demodulating the other of said side bands, and a third station comprising means for receiving and demodulating said retransmitted side band and means for coupling said last mentioned receiving means to the other end of said other portion.

3. A high frequency communication system comprising a carrier circuit having two ends, a first station comprising means for generating and modulating a carrier, a first source of intelligence signals coupled to said modulating means for producing upper and lower intelligence signal bearing side bands of said carrier, a second source of intelligence signals, means for coupling said second source to said modulating means for producing upper and lower intelligence signal bearing side bands of said carrier, means for coupling said station to one end of said carrier circuit, means for selecting and passing the upper side band of said first-mentioned side bands coupled between said modulating means and said coupling means and means for selecting the lower side band of said second-mentioned side bands coupled between said modulating means and said coupling means, a second station comprising means for receiving said selected side bands, means coupled to said receiving means for selecting and retransmitting one of said selected side bands, means coupled to said receiving means for selecting and demodulating the other of said selected side bands and means for coupling said receiving and said retransmitting means to a point intermediate the ends of said circuit, and a third station comprising means for receiving and demodulating said retransmitted side band and means for coupling said third station to the other end of said circuit.

4. A high frequency communication system according to claim 3 wherein said retransmitting means comprises means for generating a second carrier and means coupled to said last-mentioned generating means and to said second station selecting means for modulating said second carrier.

5. A high frequency communication system according to claim 4 further comprising a third source of intelligence signals coupled to said second station modulating means, means coupled between said last-mentioned modulating means and said means for coupling said retransmitting means to said circuit for selecting and passing a side band of said second carrier produced by modulation of said carrier by said selected side band and having a predetermined frequency range and for selecting and passing a different side band of said second carrier produced by modulation of said carrier by said third intelligence signals and having a frequency ranged different from said first-mentioned frequency range.

6. The method of carrier signal communication comprising generating a carrier and two side bands thereof at a first station, transmitting said two side bands, receiving said two side bands at a second station, selecting and retransmitting one of said side bands at said second station, selecting and demodulating the other of said side bands at said second station and receiving and demodulating said retransmitted side band at a third station.

7. The method of carrier signal communication comprising at a first station, generating a carrier and two intelligence signals, modulating said carrier with said intelligence signals and selecting and transmitting of the modulation products only the upper side band produced by one intelligence signal and the lower side band produced by the other intelligence signal, at a second station, receiving said selected side bands, selecting and retransmitting one of said selected side bands and selecting and demodulating the other of said selected side bands and at a third station, receiving and demodulating said retransmitted side band.

FRANÇOIS CHARLES MAURICE BERGER.

REFERENCES CITED

The following references are of record in the file of this patent:

UNITED STATES PATENTS

| Number | Name | Date |
|---|---|---|
| 1,441,270 | Espenschied | Jan. 9, 1923 |
| 1,658,337 | Jammer | Feb. 7, 1928 |
| 1,673,023 | Rettenmeyer | June 12, 1928 |
| 1,685,357 | Griggs | Sept. 25, 1928 |
| 1,719,485 | Pease | July 2, 1929 |
| 1,746,808 | Wolfe | Feb. 11, 1930 |
| 1,865,952 | Pfiffner | July 5, 1932 |
| 1,934,423 | Green | Nov. 7, 1933 |
| 2,155,821 | Goldsmith | Apr. 25, 1939 |
| 2,264,396 | Moore | Dec. 2, 1941 |
| 2,279,697 | Terponi | Apr. 14, 1942 |
| 2,289,048 | Sandalls | July 7, 1942 |
| 2,294,905 | Honaman | Sept. 8, 1942 |
| 2,298,435 | Tunick | Oct. 13, 1942 |
| 2,328,450 | Hagen | Aug. 31, 1943 |
| 2,379,052 | Weaver | June 26, 1945 |
| 2,421,727 | Thompson | June 3, 1947 |